United States Patent Office 2,710,815
Patented June 14, 1955

2,710,815

METHOD OF QUICK SETTING LIQUID PROTEIN CONTAINING COATINGS

Richard V. Young and George S. Dundon, Rochester, N. Y., assignors to Eastman Kodak Company, Rochester, N. Y., a corporation of New Jersey No Drawing. Application September 9, 1953,
Serial No. 379,286

7 Claims. (Cl. 117—34)

This invention relates to a technique of setting aqueous protein coatings characterized in that a soluble aluminum salt such as aluminum sulfate is incorporated in the coating solution and after the solution is coated onto a support therefor it is subjected to the action of gaseous ammonia.

In the applying of protein coatings from aqueous solutions thereof the coating at the time of application is in liquid condition and to facilitate the drying of that coating it is desirable that it be first set. This has been previously accomplished by subjecting the liquid coating, immediately after its application to a support, to a lower temperature whereby the chilling of the coating causes gelling thereof. The coating can then be dried such as by the application of a current of dry air. In that method setting occurs only after the coating has been chilled to the setting temperature throughout. Where the chill setting method is employed in coating paper any delay of the setting of the coating will result in the penetration of the paper by the coating liquid. Also in the drying of the chilled layers the temperature of the drying air must be limited to avoid melting of the protein layer. In the case of some types of proteins which may be employed in coating operations the chilling may even be ineffective to cause setting of the coating applied.

The setting of coatings of polyvinyl alcohol with ammonia has been described in the prior art but in those cases it has been necessary to incorporate a mixture of, for instance, a heavy metal salt and boric acid to obtain gelling by treatment with ammonia vapors.

One object of our invention is to provide a procedure for the quick setting of a liquid aqueous coating of protein when applied to a support therefor. Another object of our invention is to make possible the drying of aqueous protein layers at high temperatures without remelting occurring such as would be experienced where chill setting is used. A further object of our invention is to provide a method of coating paper with aqueous solutions of proteins wherein the liquid coating composition sets rapidly and penetration of the paper sheet is reduced to a minimum. A still further object of our invention is to provide a method of setting liquid protein coatings in which unusually small concentrations of ammonia in the treating gas are necessary. Other objects of our invention will appear herein.

We have found that aqueous solutions of protein particularly gelatin when applied to a surface of paper, film base, cloth or the like may be substantially immediately set if a soluble aluminum salt is incorporated in the coating composition and a gas containing a small concentration of ammonia is applied to the liquid layer of aqueous protein. Such treatment changes the protein solution of the liquid coated layer from the sol to the gel form. Under maximum conditions this setting up of the liquid coating occurs in a matter of seconds. The time in which the setting up occurs depends on several factors as follows:

1. *The composition of the liquid.*—It is desirable that the liquid coating composition contain at least 2% of gelatin or other protein to obtain setting or gelling in accordance with our invention. However if the coating is applied on an absorptive surface whereby part of the water is removed then even more dilute protein solutions may be set by our method. We have found that a concentration of 3–8% of protein in the coating composition is the most useful range within which to operate although as the gelatin concentration is increased such as up to 10 to 15% or even more the speed of setting is accelerated. It is also desirable that the pH of the composition be adjusted to less than 5 as the aluminum salt employed sets the emulsion coating at a fairly low pH such as at a maximum of 5.

2. *Percent of aluminum salt in the composition.*—The aluminum salt ordinarily used is aluminum sulfate or potassium aluminum sulfate although other water soluble aluminum salts such as aluminum chloride, aluminum nitrate, aluminum acetate, or the like may be employed. The percentage of aluminum salt used in the composition may be within the range of ¼–50% (based on the weight of the protein), although the most useful range is ½–10%. It may be stated as a general rule, as the protein concentration in the coating composition increases less aluminum salt is needed whereas with low protein concentrations a higher percentage of aluminum salt is desirable. If desired a small amount of formaldehyde may be included in the composition although the aluminum salt alone is sufficient for hardening purposes and the formaldehyde would only be added to serve some additional purpose therein.

3. *Concentration of $NH_3$ in the fuming gas.*—We have found that ordinarily in the use of aluminum salt the concentration of $NH_3$ in the fuming gas may be less than 0.1% such as 0.05% or even .025% all percentages being in terms of volume. In the case of higher concentrations such as .25% we have found that the tendency to set decreases unless some formaldehyde is also included in the coating composition. It is preferable to operate the setting operation with air having 500–700 p. p. m. of $NH_3$.

4. *Temperature of the surrounding gas in setting proteins in accordance with my invention.*—The surrounding gas may be at an elevated temperature such as 150° F. or more or it may be at any reasonable temperature such as one within the range of 45–160° F. It is necessary that the ammonia gas or any other agent which will raise the pH be kept from the coating composition until a layer of that composition has been spread upon a surface as otherwise setting of the composition prior to the coating operation might occur.

5. *Method of application of the ammonia.*— The ammonia should be applied to the protein coating as soon as the coating is formed thereby avoiding any movement in the liquid coating composition on the surface to which it was applied. Any of the various methods of contacting gases with surfaces may be employed in the setting operation.

As the setting of coatings in accordance with our invention occurs within the pH range of 5–7, it is desirable in coating operations in accordance with our invention that a coating composition having a pH of less than 5 such as a pH of 3 be employed. If the coating composition is not already at the desired pH, it is desirable to reduce the pH thereof such as by adding a small amount of dilute sulfuric acid thereto prior to incorporating the aluminum salt in the coating composition.

We have found that our invention is useful for setting layers of gelatin or other protein which have been supplied either clear or in dyed form to a supporting surface such as layer .0005–0.025 inch. The protein composition may, for instance, be in the form of photosensitive silver halide emulsion or in the form of a pigment layer such as employed for the baryta coating of photographic paper. We have found that our invention is particularly useful for the setting of photographic emulsions consisting of silver halide in a protein vehicle by coating out the composition as mentioned and then subjecting to fuming with an ammonia containing gas. The photographic emulsion layer thus set may then be dried without the necessity of using lowered temperatures. The photographic emulsions which may be set by our invention may have any of the commonly added materials such as sensitizers, anti-foggants, or the like therein to add to the photographic properties providing, of course, those additives are compatible with aluminum salts. Our invention is useful for the setting of layers of either washed or unwashed photographic emulsions. Our invention also is useful in the setting of gelatin or other protein coatings in which the material is applied as a clear solution to form an overcoating on a support.

If desired the coating compositions set in accordance with our invention may comprise gelatin or other protein mixed with some other compatible polymeric material. It is desirable however that the protein constitute at least 20% of the polymeric material and at least 2% of the composition of the coating liquid. Some polymers which may be mixed with the proteins are styrene-butyl acrylate-methacrylamide resins such as prepared by heating the monomers together in an aqueous polymerization system using a per type catalyst as described in Fowler application Serial No. 272,709, filed Feb. 20, 1952, acrylonitrile-ethyl acrylate known as Rhoplex resins, acrylonitrile-butyl acrylate resins, styrene-butadiene resins, styrene-acrylonitrile resins, styrene-ethyl acrylate resins and styrene-butyl acrylate resins.

One of the types of coatings which are readily and quickly set by our invention are those of gelatin-silver halide emulsions the silver halide being in suspension in an aqueous solution of the protein vehicle. These emulsions are prepared by first dispersing silver halide in a peptizing agent and forming the emulsion therefrom using gelatin or some other protein vehicle. Protein vehicles which might be employed are soy bean protein, casein, or blood albumin particularly after those proteins have been subjected to treatment with hydrogen peroxide at an alkaline pH as described in U. S. Patent No. 2,691,582 of Lowe and Gates. The emulsion is then coated out in the form of a thin layer onto a support therefor such as paper or film base and the layer is set and dried. The setting of this layer may be accomplished in accordance with our invention by incorporating aluminum salt in the emulsion and subjecting the coating thereof at the time of coating to the action of an ammonia containing gas. The chill setting method is not even operable in the use of such proteins as soy protein, casein or blood albumin. In the case of photographic emulsions, those having a concentration of gelatin or other protein of 3½–7% exhibit good setting characteristics when an aluminum salt in a proportion of ½–10% is added thereto. After the addition of the aluminum salt to the emulsion it is desirable to coat out the emulsion layer in a short time to assure the best working conditions.

Another type of use which can be made of our invention is in the baryta coating of paper. By this method a small amount of aluminum salt such as in the form of a 12–15% aqueous solution of aluminum sulfate is added to the baryta coated composition (gelatin and $BaSO_4$) and immediately after applying to the paper is passed into a chamber having ammonia containing gas therein so as to obtain immediate setting without any substantial penetration of the coating composition into the paper. The coating may then be dried by a current of warm, dry air.

The following examples illustrate our invention:

EXAMPLE 1

An unwashed gelatin-silver chlorobromide photographic emulsion containing 1¼% of anhydrous aluminum sulfate based on the weight of gelatin in the emulsion was coated on paper and set by fuming with air having a content of ammonia of less than 0.1% by volume. The emulsion coating set in five seconds. The coating thus set was then dried by subjecting to a current of warm, dry air. A paper of good photographic properties was obtained.

EXAMPLE 2

A washed gelatin-silver bromide photographic emulsion containing 4½% of anhydrous aluminum sulfate based on the weight of the gelatin in the emulsion was coated on paper and set by fuming with air having a concentration of approximately 0.05% of ammonia. The emulsion layer was set in approximately five seconds. The emulsion layer was then dried by subjecting to a current of warm, dry air. No melting of the emulsion layer occurred and a paper having good photographic properties was obtained.

We claim:

1. In the application of coatings from solutions in water of at least 2% concentration of proteins, a method of quick setting those coatings which comprises incorporating into the protein solution having a pH of less than 5¼–50% (based on the weight of the protein) of a water soluble aluminum salt, coating out the solution in fluid form onto a surface and fuming the resulting coating with an ammonia containing gas whereby rapid setting of the coating is obtained without chilling of said coating being necessary.

2. In the application of coatings of solutions in water of at least 2% concentration of protein to a surface to be coated therewith, the method of quick setting those coatings which comprises incorporating in the coating composition having a pH of less than 5¼–50% (based on the weight of the protein) of aluminum sulfate, coating out the solution in fluid form and fuming the resulting coating with a gas containing ammonia whereby rapid setting is obtained without chilling of said protein being necessary.

3. In the application of coatings of solutions in water of at least 2% concentration of gelatin to a surface to be coated therewith, a method of quick setting those coatings which comprises incorporating in the coating composition having a pH of less than 5¼–50% (based on the weight of the gelatin) of a water soluble aluminum salt, coating out the solution in fluid form onto the surface and fuming the resulting surface with a gas containing ammonia whereby rapid setting is obtained without chilling of the said coating being necessary.

4. In the application of coatings of solutions in water of at least 2% concentration of gelatin having silver halide particles suspended therein to a support therefor, a method of quick setting those coatings which comprises incorporating in the gelatin solution containing silver halide particles having a pH of less than 5¼–50% (based on the weight of the protein) of aluminum sulfate, coating out the gelatin solution in fluid form onto the support and fuming the resulting coating with a gas containing ammonia whereby rapid setting of the coating is obtained without chilling thereof being necessary.

5. In the application of coatings of solutions in water of protein of 3–8% concentration to a surface to be coated therewith, the method of quick setting those coatings which comprises incorporating in the protein solution having a pH of less than 5½–10% (based on the weight of the protein) of aluminum sulfate, coating out the protein solution in fluid form onto the surface and fuming the coating with a gas containing ammonia whereby rapid setting thereof is obtained without chilling of said coating being necessary.

6. In the application of coatings from solutions in water of 3–8% concentration of gelatin to a support therefor, the method of quick setting those coatings which comprises incorporating in the gelatin solution having a pH of less than 5½–10% (based on the weight of the gelatin) of aluminum sulfate, coating out of the gelatin solution in fluid form onto the support and fuming the coating with a gas containing ammonia whereby rapid setting thereof is obtained without chilling of the same being necessary.

7. In the application of coatings from solutions in water of gelatin of 3–8% concentration having silver halide particles suspended therein to a paper support therefor a method of quick setting those coatings which comprises incorporating in the gelatin solution having a pH of less than 5½–10% (based on the weight of the gelatin) of aluminum sulfate, coating out the gelatin solution in fluid form onto the paper support and fuming the coating thus formed with a gas containing ammonia whereby rapid setting of the silver halide coating is obtained.

References Cited in the file of this patent

UNITED STATES PATENTS

| | | |
|---|---|---|
| 2,073,666 | Wernlund | Mar. 16, 1937 |
| 2,455,936 | Lowe | Dec. 14, 1948 |
| 2,652,345 | Jones | Sept. 15, 1953 |